United States Patent
Endres

(10) Patent No.: US 9,182,924 B2
(45) Date of Patent: Nov. 10, 2015

(54) MODIFYING LOGICAL ADDRESSING AT A REQUESTOR LEVEL

(71) Applicant: Seagate Technology LLC, Cupertino, CA (US)

(72) Inventor: Carl Matthew Endres, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 219 days.

(21) Appl. No.: 13/739,943

(22) Filed: Jan. 11, 2013

(65) Prior Publication Data

US 2014/0201437 A1 Jul. 17, 2014

(51) Int. Cl.
*G06F 12/08* (2006.01)
*G06F 3/06* (2006.01)

(52) U.S. Cl.
CPC .............. *G06F 3/0653* (2013.01); *G06F 3/064* (2013.01); *G06F 3/0619* (2013.01); *G06F 3/0676* (2013.01); *G06F 3/0679* (2013.01); *G06F 3/0688* (2013.01)

(58) Field of Classification Search
CPC ..... G06F 3/0619; G06F 3/064; G06F 3/0653; G06F 3/0676; G06F 3/0679; G06F 3/0688
USPC .......................................................... 711/112
See application file for complete search history.

(56) References Cited

U.S. PATENT DOCUMENTS

| | | | |
|---|---|---|---|
| 6,000,006 A * | 12/1999 | Bruce et al. ................... 711/103 |
| 7,681,008 B2 | 3/2010 | Tomlin et al. |
| 7,747,837 B2 | 6/2010 | Gorobets et al. |
| 8,205,063 B2 | 6/2012 | Sinclair |
| 2007/0174582 A1 | 7/2007 | Feldman |
| 2010/0037017 A1 | 2/2010 | Ryu et al. |

* cited by examiner

*Primary Examiner* — Yong Choe
(74) *Attorney, Agent, or Firm* — Hall Estill Attorneys at Law

(57) ABSTRACT

Method and apparatus for managing data in a memory. In accordance with some embodiments, a control circuit monitors access operations upon a set of data blocks in a memory of a data storage device. The data blocks have a first logical address by which the data blocks are identified by a requestor coupled to the data storage device. When the monitored access operations indicate a potential data degradation condition may arise with the data blocks, the requestor assigns a different, second logical address to the data block.

20 Claims, 5 Drawing Sheets

FILE ALLOCATION TABLE

| FILENAME | LOGICAL BLOCK ADDRESSES (LBAs) |
|---|---|
| FILE1 | 1000-1019 |
| FILE2 | 2350-2399 |
| FILE3 | 14,382-16,789 |
| ⋮ | ⋮ |
| FILEN | 2,805,114-2,805,996 |

ADJUSTED FILE ALLOCATION TABLE

| FILENAME | LOGICAL BLOCK ADDRESSES (LBAs) |
|---|---|
| FILE1 | 3,000,001-3,000,020 |
| FILE2 | 2350-2399 |
| FILE3 | 14,382-16,789 |
| ⋮ | ⋮ |
| FILEN | 2,805,114-2,805,996 |

MODIFYING LOGICAL ADDRESSING AT A REQUESTOR LEVEL

SUMMARY

Various embodiments of the present disclosure are generally directed to managing data in a data storage device.

In accordance with some embodiments, a control circuit monitors access operations upon a set of data blocks in a memory of a data storage device. The data blocks have a first logical address by which the data blocks are identified by a requestor coupled to the data storage device. When the monitored access operations indicate a potential data degradation condition may arise with the data blocks, the requestor assigns a different, second logical address to the data blocks.

These and other features and aspects which characterize various embodiments of the present invention can be understood in view of the following detailed discussion and the accompanying drawings.

DETAILED DESCRIPTION

Figure 1:
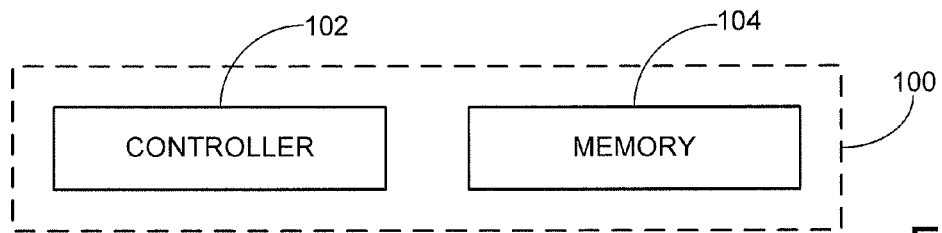
FIG. 1 provides is a functional block representation of a data storage device in accordance with various embodiments of the present disclosure.

The present disclosure generally relates to the management of data in a data storage device.

Digital data may be stored and retrieved in a variety of ways. Some data storage devices utilize rotatable media to store the data as a series of bits along concentric tracks defined on the media surfaces. Solid-state memories provide semiconductor memory cells which are arranged into an array and are each adapted to store one or more bits.

In these and other types of memories, data may be stored in the form of data blocks, or sectors, of predetermined size. The locations within the respective memories to which the blocks are stored may be assigned physical addresses, such as physical block addresses (PBAs). The form of the physical addressing will be a function of the type of memory. In rotatable memories, PBAs may include disc, head (transducer), track address and sector count components. In solid-state memories, PBAs may include dies, arrays, planes, erasure blocks, pages and bit offset components.

Addressing of the data blocks at a host level is often in the form of logical addresses, such as logical block addresses (LBAs). Usually, the logical addresses are assigned by the host and used as identifiers during access operations with the data storage device. For example, a host request to a data storage device to store a set of blocks may include a transfer of the user data to be stored, along with an identification of the LBA values associated with the transferred user data blocks. In response, the data device will perform a write operation by converting the LBA values to PBA values, and then storing the received data at the physical locations associated with the PBA values.

During a subsequent host request to the data storage device to return the user data, the host issues a list of the requested LBA values. The data storage device carries out a read operation by converting the LBA values to PBA values, and using the PBA values to locate the physical location(s) in the memory at which the data blocks are stored. The data are then read out from the physical location(s) and reconstructed for transfer to the host.

In some cases, a large number of repetitive access operations to data stored in a particular memory location can, over time, lead to a degradation of the state of the data stored in the memory location. In rotatable media, a large number of repetitive write operations can induce adjacent track interference (ATI) and side track erasure (STE) effects which can reduce the signal strength of the recovered data from a particular physical address. In solid-state memories, repetitive read operations upon a physical memory location (or to adjacent locations) can induce read-disturbances and other effects that cause charge or programmed resistance drift in the individual memory cells.

A number of solutions have been proposed in the art to address such access-based degradations. Many of these solutions are carried out internally by the data storage device in changing the LBA-PBA correspondence; that is, by relocating the stored data to a new physical location within the memory. While operable, limitations with this approach include a requirement for enhanced control complexity of the device to carry out the functions of relocating and tracking the new locations of the data. Moreover, in some applications the host (or other requestor entity) may specify that certain data be maintained at certain physical locations within the device for reliability, I/O performance or other reasons.

Accordingly, various embodiments of the present disclosure are generally directed to managing data in a memory. As explained below, some embodiments generally operate to monitor access operations associated with a set of data blocks in a memory of a data storage device. The set of data blocks, also sometimes referred to herein as a set of data, have a first logical address by which the set of data blocks are identified by a requestor. When a sufficient number of access operations have been carried out such that there is a possibility of data degradation, the data blocks are assigned a new, second logical address at the requestor level. Thereafter, the data are presented for storage by, and returned to, the requestor using the second logical address.

In some embodiments, the requestor is an external host device and the modification of the logical addressing of the data blocks is carried out in a logical structure maintained by the host, such as a file allocation table (FAT) of a host operating system (OS). The data storage device can issue a request to the host to make the change in logical addressing, and the host can send back confirmation that the change has been made. A device driver can be loaded to the host to facilitate such operations.

In other embodiments, the data storage device carries out the modification of the logical addressing internally within the device. For example, in a file-based system, a host device may issue data transfer commands in the context of requested/ transferred files. An internal server of the data storage device performs a file-to-logical address conversion, and a controller of the data storage device performs a logical-to-physical address conversion. The change in logical addressing is carried out at the internal server level.

These and other features of various embodiments can now be understood beginning with a review of FIG. 1 which provides a functional block representation of a data storage device 100. The device 100 includes a controller 102 adapted to provide top level control of the device 100, and a memory module 104 adapted to store and retrieve user data from/to a requestor entity, such as an external host device (not separately shown).

For purposes of providing a concrete example, the system 100 is contemplated as a hard disc drive (HDD) which uses rotatable magnetic storage discs in the memory module 104 to store and retrieve user data for a host personal computer (PC) or other host device. It will be appreciated that this is merely illustrative and not limiting, as the memory module 104 can alternatively incorporate any number of different types of solid-state memory such as in the case of a solid-state drive (SDD). The memory module can further incorporate both disc-based and solid-state memory such as in the case of a hybrid drive.

Figure 2:
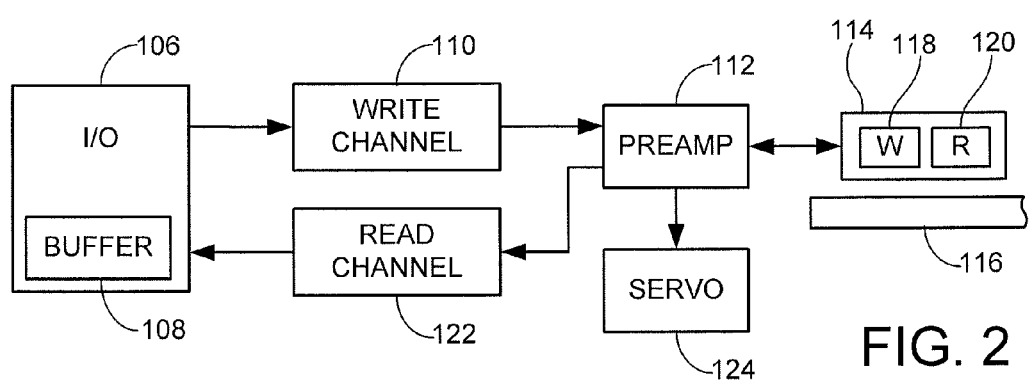
FIG. 2 illustrates aspects of the memory module of FIG. 1 in accordance with some embodiments.

FIG. 2 illustrates portions of the memory module 104 of FIG. 1 in accordance with some embodiments. An interface (I/O) circuit 106 is adapted for communications with the requestor and may include a buffer memory 108 to temporarily store data during data transfer operations between the memory module 104 and the requestor. A write channel 110 encodes input write data received from the requestor, which may include the generation of error detection and correction (EDC) and run length limited (RLL) codes, the application of encryption, and the serialization of the data.

A preamplifier/driver (preamp) 112 receives the encoded data and directs write currents to a read/write transducer 114 adjacent a rotatable magnetic storage disc 116. The transducer 114 includes a write element 118 which generates a synchronized, time-varying magnetic field to write the input data to the disc 116.

During a subsequent read operation to recover the previously written data, the transducer 114 is positioned adjacent the disc 116 and a read element 120, such as a magneto-resistive (MR) sensor, transduces a readback signal which is preamplified and conditioned by the preamp 112 and transferred to a read channel 122.

The read channel 122 applies signal processing techniques to the input readback signal to reconstruct the originally presented user data. The read channel 122 may apply on-the-fly error detection and correction and decryption of the data, as required. The recovered data are thereafter transferred to the buffer 108 pending transfer to the requestor.

During both write and read operations, a servo circuit 124 may operate to position the transducer 114 so as to align the respective write and read elements 118, 120 with the associated physical location on the disc 116 at which the user data are stored.

Figure 3:
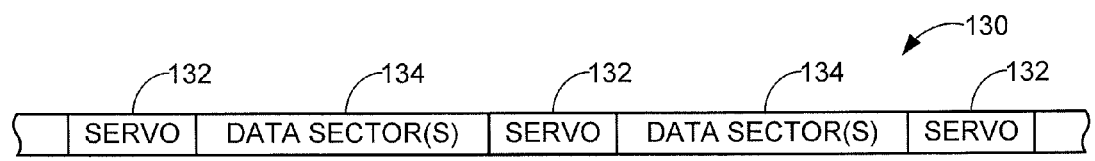
FIG. 3 is an exemplary format for data stored to the medium of FIG. 2.

FIG. 3 provides an exemplary format for a track 130 on the disc 116. A number of radially spaced-apart servo sectors 132 are arranged about the circumference of the disc 116, such as in the form of servo wedges which resemble spokes of a wheel. The servo sectors 132 store servo control data used by the servo circuit 124 of FIG. 2, and may include synchronization, index, track address and intra-track spacing dibit patterns. The servo fields 132 may be written to the disc 116 during device manufacturing.

Data sectors 134 are defined in the space along the track 130 between adjacent pairs of the servo fields 132. The data sectors 134 may be defined during a device formatting operation. Each data sector 134 is arranged to store up to a selected amount of user data, such as 512 bytes, 4096 bytes, etc. The physical addresses of the data sectors 134 are tracked by the device 100 in relation to the servo data in the servo fields 132.

Figure 4:
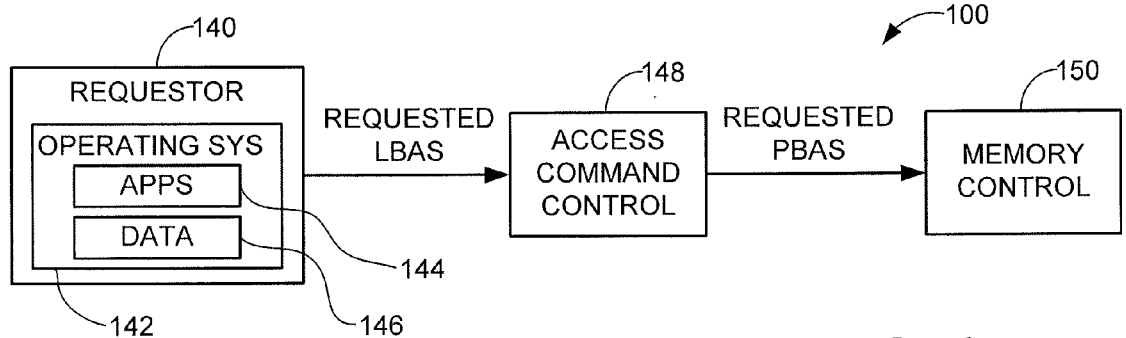
FIG. 4 provides a sequence whereby a requestor requests data from the memory module of FIGS. 1-2.

FIG. 4 generally illustrates steps carried out during a data access operation between the device 100 and a requestor 140. In FIG. 4, the requestor is contemplated as comprising an external host device with an operating system (OS) 142 executed by a processor (not separately shown). In the case of a personal computer (PC) or similar environment, the OS may be Microsoft Windows®, Linux®, etc.

One or more applications (apps) are identified at 144. The apps 144 represent software applications that are resident in or loaded to a local memory of the requestor 140 and which enable manipulation of data by the user of the requestor device. Examples include word processing apps, Internet browser apps, drawing packages, games, databases, email, scheduling programs, communication apps, etc. Control data 146 associated with the apps are also stored in the local memory of the requestor 140.

During the execution of a selected app 144, the OS 142 issues a request for data from the storage device 100. This request may be in the form of a read command configured in accordance with the interface protocol established between the requestor 140 and the storage device 100. The read command will include the identification of one or more logical block addresses (LBAs). The LBAs are logical address identifiers of the various data blocks (sectors 134 in FIG. 3) associated with the request. The LBA values for the set of data blocks may be retrieved from a logical data structure maintained as part of the control data 146.

An access command control block 148 of the data storage device 100 processes the read command and performs an LBA-PBA conversion, with the PBA(s) identifying the corresponding physical block address (es) of the requested data block(s). The requested PBAs are forwarded to a memory control block 150 of the data storage device 100. The memory control block 150 schedules a read command to return the requested data in accordance with the discussion of FIG. 2 above.

The PBAs may be defined in terms of disc surface/transducer number, track address and angular (sector) location along the selected track. Responsive to the read command, the servo circuit 124 (FIG. 2) performs a seek operation to move the associated transducer 114 to the appropriate track, and the system waits a latency delay until the associated data sectors 134 rotate adjacent the read element 120 so that the data may be transduced from the physical location. The access command control block 148 and the memory control block 150 of FIG. 4 can be incorporated into the controller 102 and/or the memory module 104 of FIG. 1.

Figures 5, 6, 7:
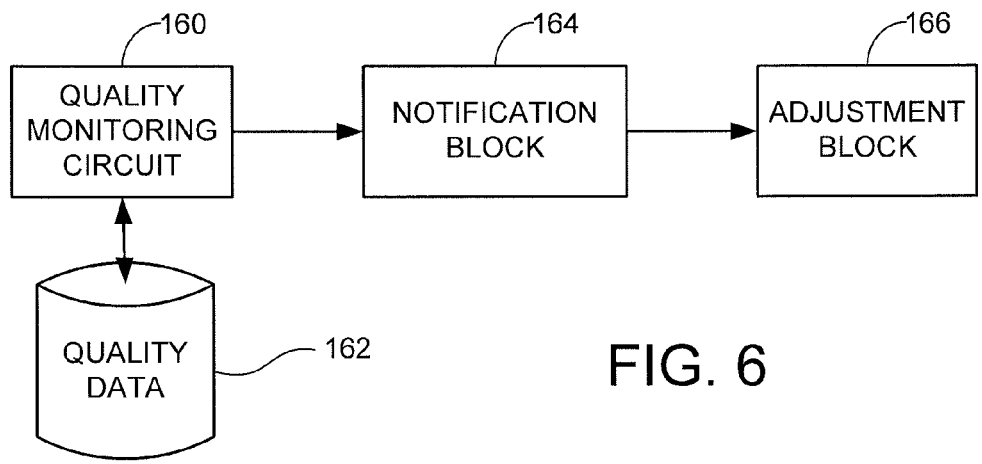
FIG. 5 is an exemplary format for a logical structure arranged as a file allocation table (FAT).
FIG. 6 depicts a sequence whereby a logical structure such as in FIG. 5 is adjusted in accordance with some embodiments.
FIG. 7 depicts an adjustment to the FAT of FIG. 5 by the adjustment circuit of FIG. 6.

FIG. 5 illustrates a general format for a file allocation table (FAT) included within the requestor control data 146 of FIG. 4. Other forms of logical data structures can be used. The FAT is utilized by the OS 142 in FIG. 4 to identify a range of LBA values for each file used by the apps 144. The files can take any number of known forms, such as at the application level (e.g., word processing files, database files, program files, etc.) or at the OS level (e.g., drivers, OS applications, etc.). The files are created, arranged and named in accordance with the organizational requirements of the OS.

The FAT identifies a number of files which are listed by filename (generically "File1" through "FileN" in FIG. 5). The table shows the associated LBA values for the set of data blocks making up each file. A request for File1, for example, would result in a read request for LBAs 1000-1019 from the data storage device 100.

FIG. 6 illustrates a quality monitoring circuit 160 operative in accordance with various embodiments. The quality monitoring circuit 160 forms a portion of the data storage device 100, such as via a programming routine executed by the controller 102 or a separate circuit dedicated to this purpose. The quality monitoring circuit 160 monitors the operation of the device and maintains quality of service (QOS) data in a memory location 162.

The QOS data generally represent metrics maintained with respect to the various data blocks that indicate a parametric state of the data blocks. The QOS data may take a variety of forms. In some embodiments, the QOS data may include write counts, read counts, error rate performance, channel quality measurements, and any other parameter indicative of the state of the data. A directed offline scan (DOS) process can be implemented at periods of low activity and/or on a scheduled or requested basis to carry out periodic assessments of the data state. The QOS data may be maintained on a block-by-block basis, a track basis, a zone basis, etc.

The monitoring circuit 160 accumulates and monitors the various QOS data parameters against various parametric thresholds. The thresholds can be established using empirical techniques, and provide an indication that the associated data are approaching a degraded condition as the QOS data approach or exceed one or more of the thresholds. An example QOS parameter may be write counts, that is, a total number of repetitive write operations of a given set of blocks to a given location. An associated QOS threshold may be a maximum number of such writes (e.g., 1000 writes, etc.) that can be carried out to the set of blocks before an assessment action needs to be taken.

When a threshold is reached for a particular QOS parameter, the monitoring circuit 160 issues a communication to a notification block 164, which in turn provides a notification to an adjustment block 166 of the requestor 140. In some embodiments, the notification can be a request to change the LBA values. In other embodiments, the notification can be a report of the out-of-range QOS parameters and any other information necessary to enable the adjustment block 166 to assess the situation and determine whether an adjustment in logical addressing for the blocks is warranted.

In either case, the adjustment block 166 can provide a return notification to the notification block 164 indicating whether or not the change in logical addressing has been made at the requestor level. If the change was made, the adjustment block 166 can further indicate the new logical addressing values for the data blocks.

FIG. 7 illustrates the FAT of FIG. 5 after an adjustment has been carried out by the adjustment block 166 of FIG. 6. It is contemplated that the blocks associated with File1 (original LBAs 1009-1019) were determined by the quality monitoring circuit 160 as having one or more of the QOS data parameters approaching or exceeding one or more associated thresholds. In response, the adjustment block 166 changed the logical association of these blocks to a new set of LBA values (in this case, LBAs 3,000,001-3,000,020).

It will be noted that the actual logical values shown in FIGS. 5 and 7 have been arbitrarily selected for purposes of illustration and can be any suitable mutually exclusive values. It will further be noted that only the LBA value identifiers, not the content of the blocks themselves, have been changed.

Once the change in LBA value has been made, subsequent requests by apps for the data blocks making up File1 will result in a request from the requestor 140 to the data storage device 100 for LBAs 3,000,001-3,000,020, rather than the old LBA values 1000-1019. The data storage device 100 or the requestor 140 can operate to select the new LBA values.

Further adjustments may be required at the storage device level to ensure data continuity. For example, if the requestor 140 simply adjusts the FAT in FIG. 7 and then requests LBAs 3,000,001-3,000,019, the storage device 100 may not know which data blocks to return in satisfaction of the read request. Accordingly, the adjustment block 166 may issue a request for the associated data blocks using the old LBA values (e.g., LBA values 1000-1019 in FIG. 5). Once the data have been transferred to the requestor 140 by the data storage device 100, the adjustment block 166 can proceed to adjust the FAT and then issue a write command to immediately return the data blocks with the new LBA values (e.g., LBA values 3,000, 001-3,000,020).

In this approach, the storage device 100 will treat the new LBAs 3,000,001-3,000,020 as a new request to store a new, different set of data and will select an appropriate location (PBA) for the newly presented data. The adjustment block 166 can further instruct the storage device 100 to discard, erase or otherwise delete the data at the PBAs associated with the old LBAs 1000-1019.

In other embodiments, the adjustment block 166 may communicate the new LBA values to the data storage device 100, and the device 100 can perform an internal adjustment by copying the data blocks to a new location in the memory and by associating the copied blocks with the new LBA values.

Figure 8:
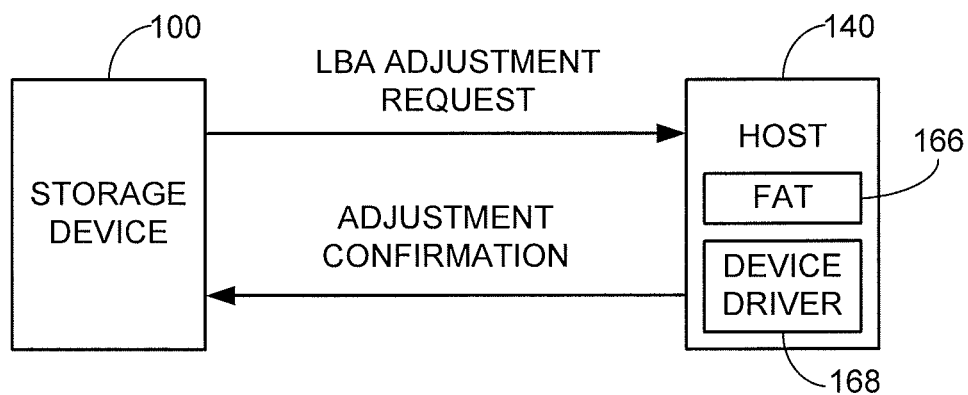
FIG. 8 is a functional block diagram of the adjustment taking place at an external host level.

FIG. 8 illustrates the foregoing operations between the storage device 100 and the requestor (external host) 140 of FIG. 4. An LBA adjustment request and an adjustment confirmation are sequentially transmitted between the respective modules. The adjustments are carried out to a FAT logical data structure 166 of the host device 140 using a device driver 168 loaded to the host for this purpose. The device driver 168 communicates the adjustment confirmation back to the storage device 100, and may take other steps discussed above as well.

Figure 9:
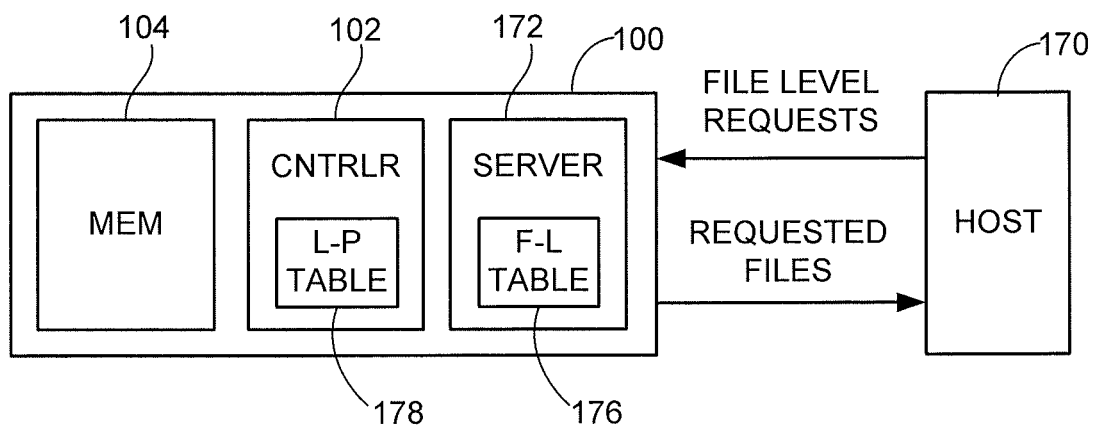
FIG. 9 is a functional block diagram of the adjustment taking place in an internal server module of the data storage device.

FIG. 9 illustrates the adjustment sequence of FIGS. 5-7 in a file-based environment. The data storage device 100 as depicted in FIG. 9 includes an internal server 172, in addition to the controller 102 and memory module 104 discussed above. The internal server 172 can be a discrete controller within the physical confines of the data storage device 100, or the functionality of the controller 102 and server 172 can be realized in a common processor within the device. The storage device 100 communicates with an external host device 170, which as before can take the form of a personal computer (PC) or other communication device.

The host device 170 is adapted to issue file-level requests directly to the data storage device 100. That is, rather than requesting a range of LBA values, the host device 170 issues a request for a particular file, such as the File1 file in FIG. 5. The server 172 includes a file-to-logical address (F-L) table 176, which may take a form similar to the FAT in FIG. 5. The internal server 172 uses the F-L table 176 to issue a request for the associated LBAs (e.g., LBAs 1000-1019 in FIG. 5) to the controller 102.

The controller 102 has a logical-to-physical address (L-P) table 178, which is used to identify the physical addresses (e.g., PBA values) where the data blocks are stored. The controller 102 proceeds to direct the memory module 104 to return the data blocks from the specified PBAs to the host. The internal server 172 carries out the transfer in the form of a file transfer of the requested File1 file.

In this embodiment, the internal server 172 operates as the requestor entity and a notification of the out-of-range QOS parameters is communicated to the server 172 by the controller 102. In response, the server 172 determines whether adjustment is warranted, and if so, adjusts the F-L table 176 such as represented in FIG. 7. In both the environments of FIGS. 8 and 9, the quality measurement parametrics, such as drive analytics and error information, can be shared with the requestor OS file system to facilitate dynamic decision making with regard to data management. As desired, the internal file server 172 can obtain permission to change the logical addressing from the external host 170, although the change will take place at the server level.

In some cases, there may be a reason why the requestor may require certain data blocks be stored in certain physical locations. For example, it is common for data blocks located radially closer to the outermost diameter (OD) of a rotatable storage disc have a characteristically higher data I/O performance rate than data blocks located closer to the innermost diameter (ID) of the disc. Moreover, certain head/disc combinations may exhibit better performance (cooler operation, faster response, etc.) than other combinations.

In these and other cases, the requestor may tentatively approve the change in logical addressing for a set of data blocks, but first may issue a request for a listing from the data storage device of available locations for the new data. The requestor may proceed to automatically or manually (e.g., via user intervention) select where the new data blocks may be stored. Alternatively, the requestor may allow the device to select the new location, but may specify that the new physical location have at least as good, if not better, performance attributes as the previous physical location. Thus, logical address changes may be configured at the data storage device level such that any relocated data blocks be placed in a selected zone, surface or other area predetermined as being an acceptable physical location for the reassigned data.

Figure 10:
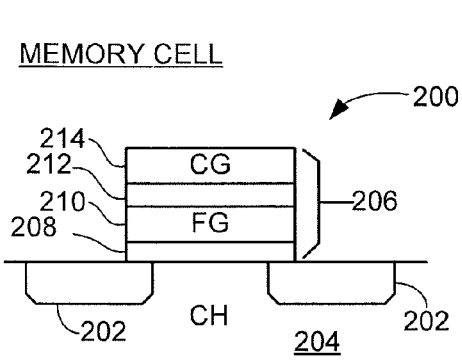
FIG. 10 depicts a flash memory cell to provide another environment for various embodiments.

While a disc drive environment has been discussed thus far in FIGS. 2-9, the foregoing data management operations are readily extendable to other types of data storage devices such as those employing solid-state memories. FIG. 10 illustrates a flash memory cell 200 as one type of solid-state memory suitable for use in the memory module 104 of FIG. 1.

The flash memory cell 200 is formed from spaced apart doped regions 202 in a semiconductor substrate 204. A gate structure 206 spans the doped regions 202. This provides a general nMOSFET (n-channel metal oxide semiconductor field effect transistor) configuration with the doped regions 202 serving as source and drain regions. The gate structure 206 includes a lower insulative barrier layer 208, a floating gate (FG) 210, an upper insulative barrier layer 212 and a control gate (CG) 214.

Data are stored to the cell 200 in relation to an amount of accumulated charge on the floating gate 210. A write operation biases the respective doped regions 202 and the control gate 214 to migrate charge from a channel region (CH) across the lower barrier 208 to the floating gate 210. The presence of the accumulated charge on the floating gate tends to place the channel in a non-conductive state from source to drain. The channel can be transitioned to a conductive state through application of sufficient voltage to the control gate 214.

Figure 11:
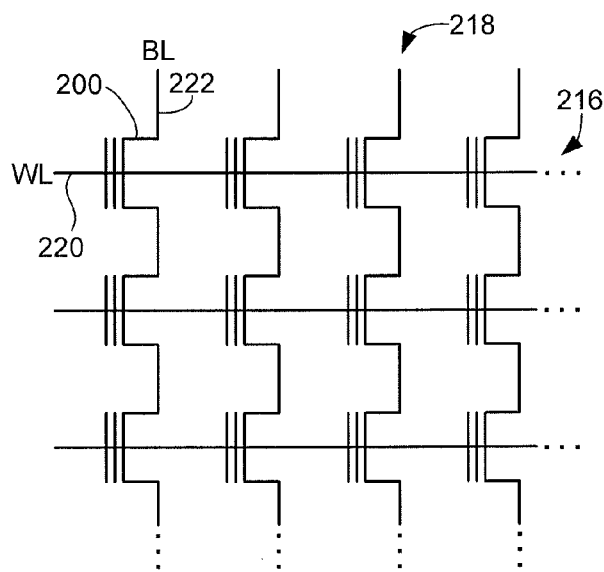
FIG. 11 is a schematic depiction of an arrangement of the memory cells in an array.

FIG. 11 illustrates a number of the flash memory cells 200 arranged into rows 216 and columns 218. The control gates 214 of the cells 200 along each row 216 are interconnected using a word line (WL) 220. The cells 200 in each column 222 are chained together in a NAND configuration, with a gate structure 206 provisioned between each adjacent pair of the doped regions 202. A bit line (BL) 222 interconnects each column of the cells.

Data are stored in each cell 200 in relation to the amount of accumulated charge on the floating gate 210 of that cell. A greater amount of accumulated charge will generally require a larger control gate voltage to render the cell conductive from source to drain. During a read operation, a sequence of voltages is successively applied, via the associated word line 220, to the control gate 214 of a selected cell 200. The remaining cells in the associated column 222 are provided with a sufficiently high control gate voltage to ensure conductivity of these other cells. The programmed state of the selected cell 200 is determined in relation to the smallest voltage magnitude in the applied sequence that places the selected cell 200 in a conductive state and allows current to flow along the associated bit line 222.

An erasure operation reverses the polarities of the source and drain regions 202 and the control gate 214 to migrate the accumulated charge from the floating gate 210 back to the channel to reset (erase) the memory cell. Once programmed, an erasure operation is generally required before the cells 200 can be used to store new, updated data. Thus, updates to a given set of LBAs are usually written to a new set of cells, and the older version is marked as stale.

The cells 200 can be configured as a single-level cell (SLC) or a multi-level cell (MLC). An SLC stores a single bit; a normal convention is to assign the logical bit value of 1 to an erased cell (substantially no accumulated charge) and a logical bit value of 0 to a programmed cell (presence of accumulated charge). An MLC stores multiple bits, such as two bits. Generally, n bits can be stored using $2^n$ storage states.

Figure 12:
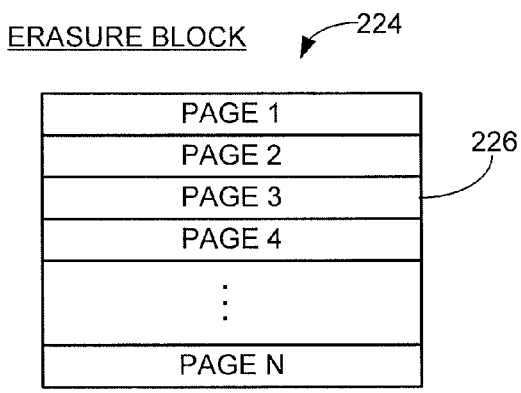
FIG. 12 provides an exemplary format for an erasure block.

FIG. 12 shows an example format for an erasure block 224. The block 224 includes N pages 226, with each page corresponding to a row 216 in FIG. 11. In an SLC environment, each row of memory cells stores a single page of data. In an MLC each row of memory cells stores multiple pages of data, with each cell storing multiple bits, one bit per page.

The erasure blocks 224 represent the smallest increment of the memory cells 200 that can be erased at a time. Multiple erasure blocks 224 may be combined into multi-block garbage collection units (GCUs), which are allocated and erased as a unit during a garbage collection operation.

Figure 13:
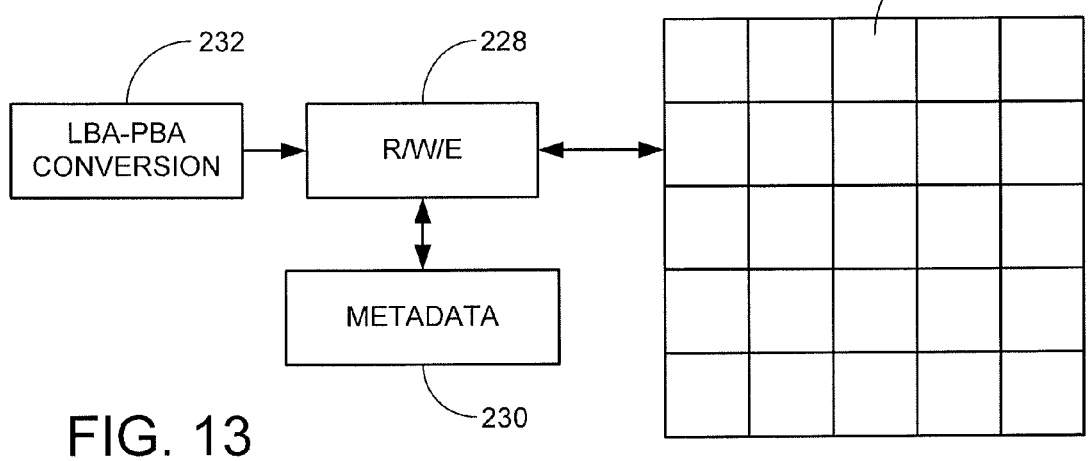
FIG. 13 shows an arrangement of the erasure blocks in conjunction with a read/write/erasure (R/W/E) circuit that uses metadata to track data access operations.

FIG. 13 illustrates read/write/erasure (R/W/E) circuitry 228 operative to carry out access operations with the erasure blocks 224 of FIG. 12. Metadata, constituting control data used to track the locations of various data blocks, may be stored in the erasure blocks 224 and transferred to a local memory 230 for reference by the system. When multiple versions of a set of data blocks are successively written to the erasure blocks 224, each version is written to a new location, and the older version is marked as stale. A forward pointer system may be implemented in the metadata to locate the physical address (e.g., PBA) at which is stored the latest version of a set of data blocks.

An LBA-PBA conversion module 232 may process an access request (e.g., a read request) from a requestor, such as the external host or internal server discussed above. The conversion module 232 operates to convert the requested LBA values to the corresponding PBA values (e.g., die, array, plane, GCU, erasure block, page, bit location, etc.). The R/W/E circuit 228 then schedules a read operation upon the associated physical address.

In an erasable memory such as depicted in FIGS. 10-13, it will be appreciated that each time a given set of data blocks is presented for storage, the data blocks will generally be written to a new physical location within the flash memory array. Moreover, current revision data blocks may be relocated by the system during garbage collection and other data management routines. Nevertheless, benefits may arise from the use of logical address modifications in erasable flash memories and other forms of solid-state memories.

Changing the logical addressing of a set of data blocks at the requestor level in an erasable memory environment may generally eliminate the need to continue to retain a large number of older versions of the data blocks, as well as the associated extensive metadata structures with multiple forward pointers to locate the latest version of the data blocks. Accordingly, the various circuits discussed in FIGS. 4-9 can be easily implemented in the flash memory environment of FIGS. 10-13, as well as in other solid-state memory systems. It is contemplated that the implementation of such systems can improve I/O performance and system reliability by reducing both metadata tracking complexity and reducing read-disturb and write-disturb effects. Improved data security can also be attained, particularly when a new encryption scheme is employed for the data blocks based on (or selected in relation to) the new logical addressing.

In the case of MLC programming where two or more sets of data blocks are stored across the same set of memory cells (e.g., the same row of cells 216 in FIG. 11), a change in logical addressing may be applied to each of the sets of the data blocks, or just for that set of data blocks experiencing the highest access rate. In some cases, changes in logical addressing may be requested for and applied to data block sets that are adjacent high areas of activity but are not themselves subject to excessive access rates.

Figure 14:
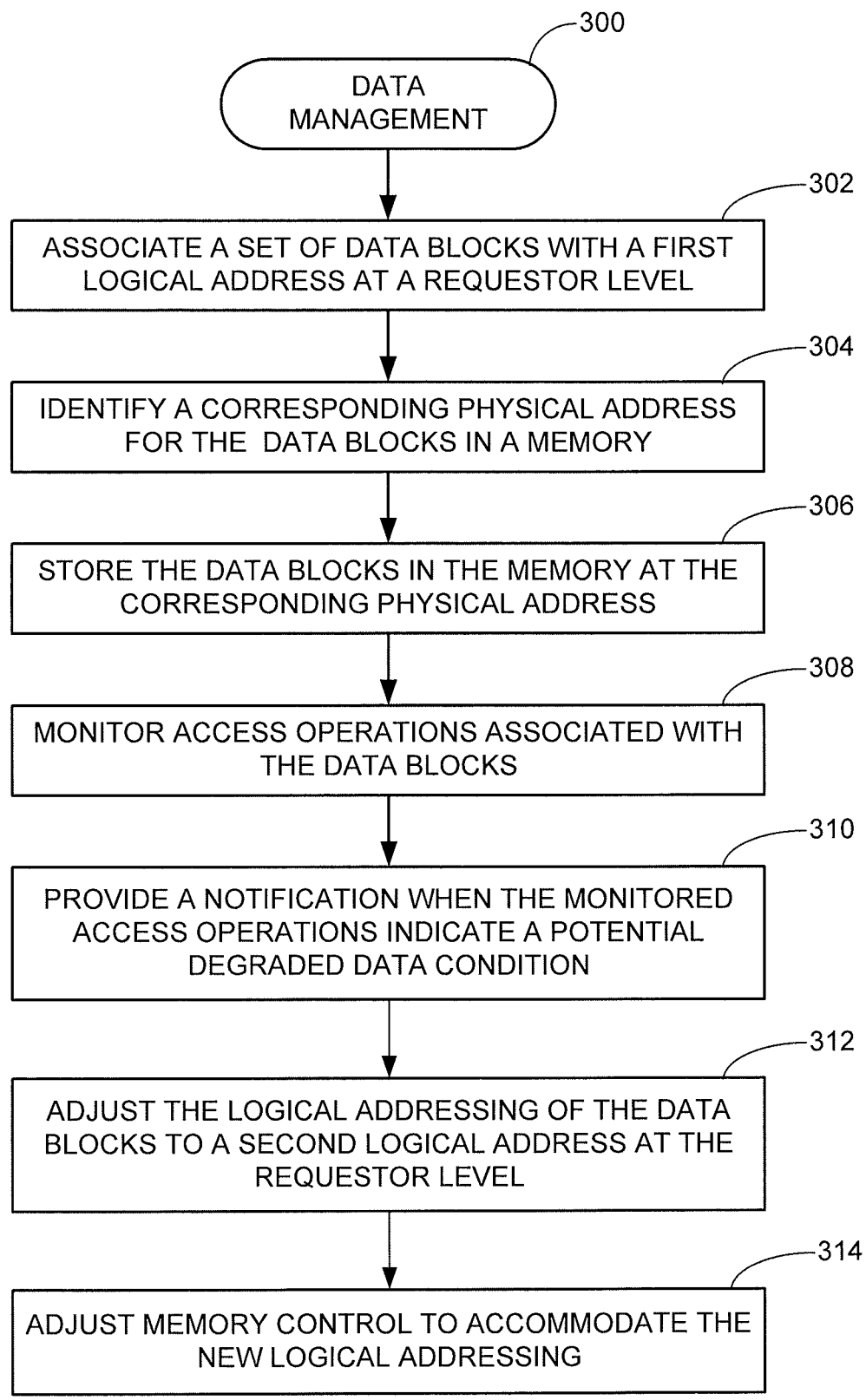
FIG. 14 is a flowchart illustrating steps that may be carried out in accordance with various embodiments.

FIG. 14 provides a flow chart for a DATA MANGEMENT routine 300 generally illustrative of steps carried out in accordance with the foregoing discussion. For purposes of illustration, the routine 300 will be discussed using the disc-based memory environment of FIGS. 2-9. The discussion can readily be extended to the solid-state flash memory environment of FIGS. 10-13, as well as to other memory environments.

A set of data blocks is provided with a first logical address at step 302. This is carried out at the requestor level. The first logical address may be a first set of logical block addresses (LBA values) or may take some other form. For purposes herein, logical addressing will be understood as a unique identifier associated with the data blocks that is independent of the physical location at which the data may be stored at a lower memory hierarchy within the system. In other words, a logical address can be associated with any number of different physical addresses in a given memory level. Thus for example, a physical address at a higher level (e.g., a cache line, etc.) can serve as a logical address for a lower level of memory.

Step 302 may also include the generation or updating of a logical structure at the requestor level which records the logical block addressing association. The logical structure can take the form of a FAT or other logical structure. Higher level associations can be tracked as well by the logical structure, such as a file name or other identifier for the set of data blocks.

A corresponding physical address for the first logical address is identified at step 304. The physical address generally represents a unique identifier associated with the data blocks that is dependent upon the physical location at which the data are stored at the lower memory hierarchy within the data storage device. In a disc-based environment, the physical address may constitute a physical block address (PBA) which may include head/surface number, zone number, track number, sector number, etc.

The data blocks are transferred and stored at step 306 at the physical location within the memory corresponding to the physical address identified in step 304. Logical to physical associations (e.g., an LBA-PBA table, etc.) can be established at the memory level of the data storage device to support subsequent data access operations upon the data blocks.

Such subsequent data access operations upon the set of data blocks are monitored at step 308. Monitored parameters, such as quality of service (QOS) data, may be accumulated during this step. Examples include but are not limited to read counts, write counts, erasure counts, channel quality measurements, error rates, and any other parameters which serve to characterize or are otherwise associated with the state of the stored data blocks. During the monitoring step, the various accumulated parameters may be compared to one or more thresholds.

At step 310, a notification is provided responsive to one or more of the monitored parameters of step 308 indicating a potential degraded data condition. The notification may take a variety of forms. As discussed above, in some embodiments the QOS data and any other control information are transferred to the requestor for evaluation thereof. In other embodiments, a request is issued to modify the logical association of the set of data blocks.

An adjustment of the logical addressing of the data blocks is carried out at step 312. The adjustment results in a reassignment of the logical addressing to a different, second set of logical addresses (such as a second set of LBAs) at the requestor level. This may be carried out in a variety of ways, such as by an adjustment to the logical data structure at the requestor level (e.g., the FAT or other data structure).

At step 314, further adjustments are performed at the data storage device level to accommodate the new logical addressing associated with the set of data blocks. These may be carried out in a variety of ways. In some embodiments, the requestor communicates the new logical addressing (e.g., second LBA values) to the data storage device, and the data storage device copies the contents of the data blocks at the existing physical location (first PBA value) to a new physical location (second PBA) and associates the second LBA values with the second PBA value. Alternatively, the requestor may request the set of data blocks be transferred from the first physical location and then provide a write command to write the data blocks with the new logical addressing. Other steps may be carried out at the data storage device level as well, such as deleting or otherwise removing the older versions of the set of data blocks at the first physical address.

It will now be appreciated that the various embodiments presented herein can provide a number of benefits. Various potentially pending failure modes related to adjacent track interference (ATI), .side track erasure (STE), read and write disturbances, lubricant disturbances, etc. can be detected and alleviated prior to impact upon the stored data blocks.

The sharing of parametric data at the requestor (e.g., OS file system level, etc.) associated with various data blocks can enable the requestor to perform data analytics and determine the best way to modify the storage of the data based on other requestor level requirements. This facilitates dynamic data management and decision making by the entity that owns or otherwise controls/requests the data, and ensures any data remapping is carried out in a way that will not affect other aspects of the system. The actual point at which logical addressing changes are made are thus determined at the requestor level, not the storage device level. Different requestors may tailor the management decisions for different types of user data and historically available metrics.

Even if the requestor ultimately rejects a change in logical addressing at a particular point in time, the requestor will nevertheless have received updates on the performance of the existing data, which can be useful for data management purposes. For example, the requestor may maintain the data in multiple locations external to the data storage device (of which the data storage device may not be aware) and so the requestor may elect to change the workload routing of the access operations based on the reported metrics. Moreover, the requestor may elect to delay the logical addressing modification until a better, more convenient time based on existing or anticipated data I/O requirements.

If the requestor proceeds to adjust the logical addressing, the scheme provides a straightforward and simple implementation that reduces the likelihood of data loss and improves both system reliability and data continuity. In some embodiments, the requestor may issue a request for available locations for the new data within the data storage device memory, or may specify that the new physical location have at least as good, if not better, performance attributes as the previous physical location.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
monitoring access operations associated with a set of data in a memory of a data storage device, the set of data having a first logical address by which the set of data is identified by a requestor and a first physical address in the memory at which the set of data is stored; and
assigning the set of data to a different, second logical address responsive to the monitored access operations indicating a potential data degradation condition associated with the first physical address.

2. The method of claim 1, further comprising communicating a notification from the data storage device to the requestor, and updating a logical data structure of the requestor to associate the set of data with the second logical address responsive to the notification.

3. The method of claim 2, in which the notification comprises a request to change the first logical address of the set of data.

4. The method of claim 2, in which the notification comprises measured parameters associated with the monitored access operations, and in which a control circuit of the requestor evaluates the measured parameters and assigns the second logical address responsive to said evaluation.

5. The method of claim 1, in which the first logical address comprises a first logical block address (LBA), the set of data is stored at a first physical block address (PBA) in the memory associated with the first LBA, the second logical address comprises a different, second LBA not appearing in the first logical address, and the method further comprises storing the set of data at a second PBA in the memory associated with the second LBA.

6. The method of claim 1, in which quality of service (QOS) parameters are accumulated during the monitoring of the access operations, the QOS parameters comprising at least a selected one of a read count, a write count, an erasure count, an error rate or a channel quality measurement, and the second logical address is assigned responsive to one or more of the QOS parameters.

7. The method of claim 1, in which the requestor is an external host device coupled to the data storage device, and the method further comprises adjusting a logical data structure in the external host device to reflect the assigned second logical address for the set of data.

8. The method of claim 7, in which the logical data structure comprises a file allocation table (FAT) maintained by an operating system (OS) of the external host device.

9. The method of claim 1, in which the requestor is an internal server of the data storage device which receives file-based data transfer requests from an external host device coupled to the data storage device, and in which the method further comprises adjusting a logical data structure of the internal server to reflect the assigned second logical address for the set of data.

10. The method of claim 1, in which the memory comprises a rotatable magnetic data storage disc.

11. The method of claim 1, in which the memory comprises a solid-state semiconductor memory.

12. An apparatus comprising:
a memory of a data storage device adapted to store a set of data blocks received from a requestor to a location in the memory having a physical address, the set of data blocks having a first logical address by which the set of data blocks are identified by the requestor; and
a control circuit adapted to monitor access operations associated with the set of data blocks and to output a notification to the requestor indicating a potential data degradation condition associated with the set of data blocks, the notification serving as a request to the requestor to assign the set of data blocks to a different, second logical address responsive to the monitored access operations.

13. The apparatus of claim 12, in which the control circuit is adapted to receive a communication from the requestor that the set of data blocks have been assigned the second logical address, and to store the set of data blocks at a second physical address associated with the second logical address.

14. The apparatus of claim 12, further comprising said requestor, wherein the requestor is adapted to modify a logical data structure to reflect the assignment of the second logical address to the set of data blocks.

15. The apparatus of claim 14, in which the requestor is an internal server of the data storage device which operates to receive file-based transfer requests from an external host device.

16. The apparatus of claim 14, in which the requestor is an external host device coupled to the data storage device.

17. An apparatus comprising:
a data storage device comprising a first memory adapted to store a set of data blocks to a selected location in the first memory having a first physical address and a first control circuit adapted to monitor state parameters associated with the set of data blocks stored in the selected location; and
a requestor coupled to the data storage device comprising a second memory and a second control circuit, the second control circuit adapted to assign a first logical address to the set of data blocks, to request data transfer operations with the data storage device to transfer the set of data blocks between the first memory and the second memory, and to assign a different, second logical address to the set of data blocks responsive to a notification from the first control circuit that the set of data blocks at the physical address have been subjected to a potential data degradation condition based on the monitored state parameters.

18. The apparatus of claim 17, in which the requestor is an external host device which executes an operating system (OS), and in which the requestor modifies a logical data structure maintained by the OS to reflect the change in logical addressing for the set of data blocks from the first logical address to the second logical address.

19. The apparatus of claim 17, in which the first control circuit is further adapted to, responsive to the assignment of the second logical address to the set of data blocks, to store the set of data blocks to a second physical address in the memory.

20. The apparatus of claim 17, in which the second control circuit evaluates the monitored state parameters and assigns the second logical address responsive to said evaluation.

* * * * *